United States Patent
McCool et al.

(10) Patent No.: US 11,186,788 B2
(45) Date of Patent: Nov. 30, 2021

(54) METHODS FOR SEPARATING WAX PRODUCTS FROM HYDROCARBON FEEDSTREAMS

(71) Applicant: ExxonMobil Research and Engineering Company, Annandale, NJ (US)

(72) Inventors: Benjamin A. McCool, Annandale, NJ (US); Yogesh V. Joshi, Annandale, NJ (US); Dhaval A. Bhandari, Bridgewater, NJ (US); Roberto Garcia, Easton, PA (US); Randall D. Partridge, Califon, NJ (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 251 days.

(21) Appl. No.: 16/448,117

(22) Filed: Jun. 21, 2019

(65) Prior Publication Data
US 2019/0390126 A1    Dec. 26, 2019

Related U.S. Application Data

(60) Provisional application No. 62/690,066, filed on Jun. 26, 2018.

(51) Int. Cl.
*C10G 73/02* (2006.01)
*B01D 3/14* (2006.01)
(Continued)

(52) U.S. Cl.
CPC .............. *C10G 73/02* (2013.01); *B01D 3/145* (2013.01); *B01D 61/58* (2013.01); *B01D 69/02* (2013.01);
(Continued)

(58) Field of Classification Search
CPC .. C10G 73/02; C10G 73/06; C10G 2300/205; C10G 2300/30; C10G 2300/301;
(Continued)

(56) References Cited

U.S. PATENT DOCUMENTS

| | | |
|---|---|---|
| 4,978,454 A | 12/1990 | Sweet |
| 5,256,297 A | 10/1993 | Feimer et al. |

(Continued)

FOREIGN PATENT DOCUMENTS

EP    0146298 A2    6/1985

OTHER PUBLICATIONS https://pubchem.ncbi.nlm.nih.gov/compound/Eicosane#section=13C-NMR-Spectra. (Year: 2021).*

(Continued)

*Primary Examiner* — Randy Boyer
*Assistant Examiner* — Juan C Valencia
(74) *Attorney, Agent, or Firm* — Scott F. Yarnell

(57) ABSTRACT

Disclosed are methods and apparatuses for separating a wax product from a hydrocarbon feedstream by a) conducting a hydrocarbon feedstream to a membrane separation zone; b) retrieving at least one retentate product stream from the first side of the membrane element; c) retrieving at least one permeate product stream having a wax phase and an oil phase from a second side of the membrane element, wherein a pour point of the wax phase of the permeate product stream is higher than a pour point of the oil phase of permeate product stream; and d) separating a wax product from the wax phase of the permeate product stream.

41 Claims, 9 Drawing Sheets

(51) Int. Cl.
  *B01D 61/58* (2006.01)
  *B01D 69/02* (2006.01)
  *B01D 69/14* (2006.01)
  *C10G 73/06* (2006.01)

(52) U.S. Cl.
  CPC ........... *B01D 69/148* (2013.01); *C10G 73/06* (2013.01); *B01D 2317/02* (2013.01); *B01D 2325/34* (2013.01); *C10G 2300/205* (2013.01); *C10G 2300/30* (2013.01); *C10G 2300/301* (2013.01)

(58) Field of Classification Search
  CPC ........ C10G 2300/308; C10G 2300/304; C10G 73/04; C10G 73/28; C10G 73/26; C10G 53/02; C10G 53/04; B01D 3/145; B01D 61/58; B01D 69/02; B01D 69/148; B01D 2317/02; B01D 2325/34
  See application file for complete search history.

(56) References Cited

U.S. PATENT DOCUMENTS

| | | | |
|---|---|---|---|
| 6,174,843 B1 * | 1/2001 | Peyton | C10M 145/16 508/468 |
| 7,736,493 B2 | 6/2010 | Leta et al. | |
| 7,837,879 B2 | 11/2010 | Leta et al. | |
| 7,867,379 B2 | 1/2011 | Leta et al. | |
| 7,871,510 B2 | 1/2011 | Leta et al. | |
| 7,897,828 B2 | 3/2011 | Nadler et al. | |
| 7,931,798 B2 | 4/2011 | Gorbaty et al. | |
| 7,943,037 B2 | 5/2011 | Gorbaty et al. | |
| 8,177,965 B2 | 5/2012 | Leta et al. | |
| 8,845,886 B2 | 9/2014 | Calabro et al. | |
| 8,864,996 B2 | 10/2014 | Leta et al. | |
| 9,546,330 B2 * | 1/2017 | Koseoglu | C10G 65/12 |
| 2009/0057192 A1 | 3/2009 | Leta et al. | |
| 2009/0057203 A1 * | 3/2009 | Leta | C10G 31/11 208/309 |
| 2009/0062590 A1 * | 3/2009 | Nadler | C10G 55/04 585/818 |
| 2016/0168485 A1 | 6/2016 | Li et al. | |
| 2017/0369794 A1 | 12/2017 | Renkema et al. | |

OTHER PUBLICATIONS

The International Search Report and Written Opinion of PCT/US2019/038397 dated Sep. 20, 2019.
The International Search Report and Written Opinion of PCT/US2019/038403 dated Oct. 2, 2019.

* cited by examiner

METHODS FOR SEPARATING WAX PRODUCTS FROM HYDROCARBON FEEDSTREAMS

CROSS-REFERENCE TO RELATED APPLICATIONS

This application claims the benefit of U.S. Provisional Application No. 62/690,066, filed on Jun. 26, 2018, the entire contents of which are incorporated herein by reference.

FIELD

The present invention relates to methods and apparatuses for separating a wax product from a hydrocarbon feedstream, and to methods and apparatuses for removal of wax from refinery steams to improve the efficiency and productivity of refinery processes.

BACKGROUND

A large proportion of hydrocarbon feed streams, particularly raw crudes, are highly challenged due to a high content of wax. For example, crude oils and more specifically shale and tight oils that have substantial wax content that can be problematic for transportation, storage and their blending with heavier crudes due to asphaltene destabilization. Conventional refineries originally designed to run heavier crude grades face challenges when processing these lighter crudes due to insufficient distillation capacity at the top of the atmospheric column. The solid and wax forming tendency of these crudes can cause cold preheat train fouling, desalter upsets, and fouling of hot preheat exchangers and furnaces. Variations in finished product quality of fuels and base stocks have also been observed in addition to operational issues causing reduced refinery throughput.

Conventionally, wax is a co-product of solvent-based lube basestock production. Deasphalted residuals, vacuum gas oils streams are processed through an aromatics extraction process followed by a solvent dewaxing processes using chilled anti-solvent, such as MEK-Toluene, MEK/MIBK, or Propane to provide wax and base oil products. These are very energy intensive processes requiring substantial solvent recycle, typically with a weight ratio of solvent to oil is around 5:1. Catalytic lube oil basestock production based on hydrocracking, catalytic dewaxing (such as MSDW or MWI) and hydrofininishing have substantially reduced wax co-production compared to traditional solvent-based processes. Wax is also produced synthetically by the Fischer-Tropsch (FT) process using carbon monoxide and hydrogen as feedstock, producing saturated, straight-chain hydrocarbons. The FT process is highly capital and energy intensive with limited world-scale capacity. With the continued decline of the solvent-based basestock production process, the wax supply is anticipated to drop.

Use of membranes to perform separations in a refinery has been disclosed. For example, separation of crude oil by membranes was disclosed in U.S. Pat. Nos. 8,845,886 and 8,864,996, and separation of heavy hydrocarbon streams with membranes was disclosed in U.S. Pat. Nos. 5,256,297; 7,736,493; 7,837,879; 7,867,379; 7,871,510; 7,897,828; 7,931,798; 7,943,037; 8,177,965; 8,845,886 and 8,864,996.

U.S. Pat. No. 8,845,886 relates to a process for separating a hydrocarbon stream via a filtration process to produce an upgraded permeate stream with decreased conradson carbon residue content, where a functionalized porous ceramic filter is described. U.S. Pat. No. 8,864,996 relates to a process for producing a product stream with improved reduction of Micro Carbon Residue (MCR) and a reduced average boiling point from a heavy hydrocarbon feedstream utilizing a high-pressure, low-energy separation process. However, neither case mentions how to separate a wax product from a hydrocarbon feedstream.

SUMMARY

The present invention provides a method for separating a wax product from a hydrocarbon feedstream, particularly a raw crude, in a low energy consumption manner.

According to an embodiment of the invention, a method for separating a wax product from a hydrocarbon feedstream is provided, which comprises: a) conducting a hydrocarbon feedstream to a membrane separation zone, wherein the raw crude contacts a first side of a membrane element, and the membrane element comprises at least one membrane; b) retrieving at least one retentate product stream from the first side of the membrane element; c) retrieving at least one permeate product stream having a wax phase and an oil phase from a second side of the membrane element, wherein a pour point of the wax phase of permeate product stream is higher than a pour point of the oil phase of permeate product stream; and d) separating a wax product from the wax phase of permeate product stream.

According to another embodiment of the invention, an apparatus for separating a wax product from a hydrocarbon feedstream is provided, which comprises a membrane separation unit and a wax-oil separation unit, wherein: the membrane separation unit comprises a membrane element, and the membrane element has at least one membrane, a retentate zone wherein the hydrocarbon feedstream contacts a first side of the membrane element, and a permeate zone from which a permeate product stream is obtained from a second side of the membrane element, wherein the permeate product stream has a wax phase and an oil phase, and a pour point of the wax phase of permeate product stream is higher than a pour point of the oil phase of permeate product stream; and the wax-oil separation unit separates a wax product from the wax phase of permeate product stream, wherein the wax-oil separation unit is selected from the group consisting of: a wax settler, a centrifuge, a wax filter, a crystallizer, a cyclone, a fluid extraction device, a solvent dewaxing device and a combination thereof.

DETAILED DESCRIPTION

Figure 1:
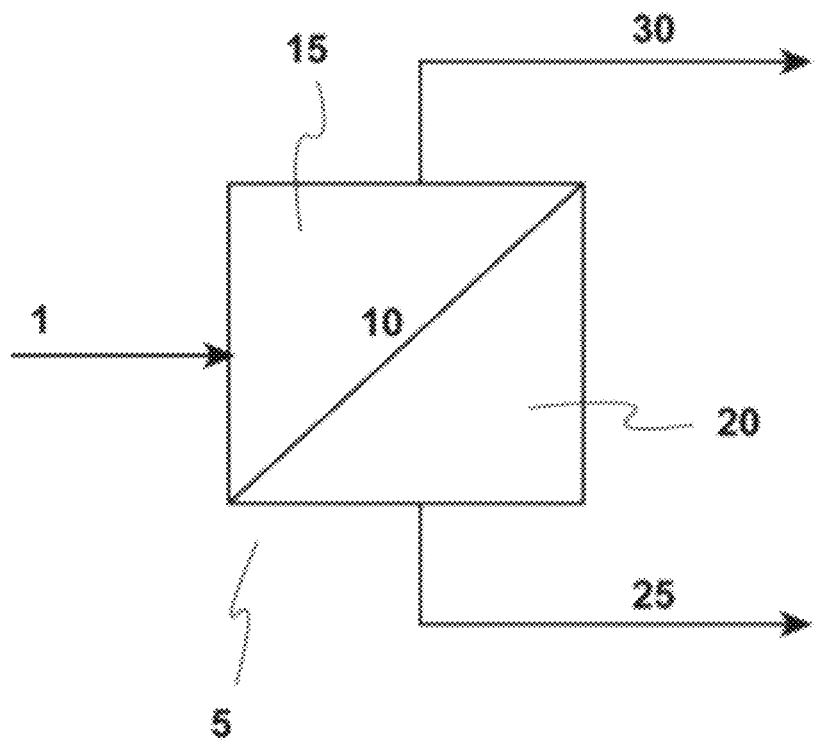
FIG. 1 illustrates an embodiment of the present disclosure using a membrane in a membrane separation process for a raw crude.

The present inventors discovered a method that unexpectedly separates wax from a hydrocarbon feed stream, particularly a raw crude, in a simple and low energy consumption manner, which can have a significant impact on the processability of raw crudes. For waxy crudes the inventive separation method provides substantial wax separation early in the process, thereby eliminating problems such as high wax levels in refined product streams. By concentrating the wax from the raw crude in low energy separations, full boiling range paraffinic stream is available with wax and oil co-products.

This invention provides a unique source and quality of wax product, while improving the hydrocarbon feedstream quality to the refinery. The membrane separation selectively removes the largest n-paraffin molecules from the hydrocarbon feedstream, while also selectively removing asphaltenes and other high molecular weight ring systems. The relatively high quantities of light hydrocarbons found in tight oils, such as Eagle Ford, Permian, Marcellus, Barnett, for example, appear to facilitate separation of the high molecular weight waxes at ambient temperatures from the permeate product stream. Wax-oil separation of the wax phase of the permeate product stream improves the processability of the remaining oil fraction. In a comparison, traditional solvent-based dewaxing is done on vacuum gas oil feed streams which is a significantly small fraction of the hydrocarbon feedstream. If these conventional processes are done on the hydrocarbon feedstream, particularly the raw crude, the solvent requirement will be significantly high making the process not viable for any commercial operation. The wax product of this invention is also essentially free of asphaltenes, metals and avoids the energy consumption of traditional solvent-based dewaxing.

If the inventive method is practiced in the production field, wax separation could have a significant impact on the transportation of these hydrocarbon feedstreams by pipeline, while also providing a source of valuable wax product which could be shipped by truck or railway.

In summary, the inventive method can provide several advantages: a) full boiling range paraffinic permeate product streams for wax and basestock lubricant products; b) separation of paraffinic molecules up-front from a hydrocarbon feedstream which can cause problems downstream, such as off-spec products and heat exchanger fouling; c) operator flexibility with respect to disposition of wax cut-lubes, wax, bright stock, for example; and d) increased throughput as most existing refineries are distillation capacity limited for lighter crudes.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the apparatuses and methods encompassed are not limited to the specific embodiments described below, but rather, include all alternatives, modifications, and equivalents falling within the true spirit and scope of the appended claims.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting.

The term "Conradson Carbon Residue" ("CCR") and "Micro Carbon Residue" ("MCR") as used herein are considered equivalents and is a measure of carbon content of a sample as measured per test method ASTM D4530.

The term "average boiling point" as used herein is defined as the mass weighted average boiling point of the molecules in a mixture. This may be determined by simulated distillation gas chromatography (also referred to herein as "SIMDIS"). The term "final boiling point" is defined as the temperature at which 95 wt % of the mixture is volatized at atmospheric (standard) pressure. All SIMDIS procedures described herein were carried out according to test method ASTM D7169. Boiling points, including fractional weight boiling points, can be determined using any appropriate ASTM test method, such as the procedures described in ASTM D2887, D2892, D6352, D7129, and/or D86.

The term "molecular weight cut-off" or "MWCO" is a characterization method to describe the pore size distribution and retention capabilities of membranes. It is defined as the lowest molecular weight (in Daltons) at which greater than 90% of a solute with a known molecular weight is retained by the membrane. Dextran, polyethylene glycol, polystyrene and dye molecules of various molecular weights are commonly used to obtain the MWCO of membranes. For example, a membrane that can retain solutes with molecular weights of 10,000+ Daltons has a molecular weight cutoff of 10,000. ASTM E1343-90 describes a standard test method for MWCO evaluation of flat sheet ultrafiltration membranes.

The term "2D-GC" refers two-dimensional gas chromatography as described in U.S. Pat. No. 9,176,102.

Hydrocarbon Feedstreams

The present invention discovers a cost-effective method to separate a wax product from a hydrocarbon feedstreams.

A wide range of hydrocarbon feedstreams are contemplated by the present invention. "Hydrocarbon feedstreams" for various embodiments of the present invention include but not limited to: raw crudes, reduced petroleum crudes, atmospheric, cycle oils, gas oils, light to heavy distillates including raw virgin distillates, hydrocrackates, hydrotreated oils, petroleum-derived waxes, Fischer-Tropsch waxes, raffinates, deasphalted oils, and mixtures of two or more of these materials.

The term "raw crude" as used herein, means whole crude or unrefined crude oils. We have found in this invention that membrane separations on raw crude across a range of API density can produce a permeate product high in saturates while also dramatically reducing metals content. In some embodiments, the raw crudes have an API density greater than 20, or 30, or 40, or 50, or 60, or alternatively the API density of the raw crude is in a range of about 20 to 60, or about 20 to about 50, or about 20 to 40.

Permeate Product Streams and Wax Products Separating Therefrom

After a membrane separation, a permeate product stream having a wax phase and an oil phase is obtained, wherein a pour point of the wax phase of permeate product stream is higher than a pour point of the oil phase of permeate product stream.

In some embodiments, the wax phase of the permeate product stream has a pour point of at least 15° C., or 16° C., or 17° C., or 18° C., or 19° C., or 20° C., or 21° C., or 22° C., or 23° C., or 24° C., or 25° C., or 26° C., or 27° C., or 28° C., or 29° C., or 30° C., or 40° C., or 50° C., or 60° C., or alternatively a pour point in a range of from about 15° C. to about 60° C., or about 15° C. to about 40° C., or about 15° C. to about 30° C., or about 15° C. to about 19° C.

In some embodiments, the oil phase of the permeate product stream has a pour point of at least 15° C., or 16° C., or 17° C., or 18° C., or 19° C., or 20° C., or 21° C., or 22° C., or 23° C., or 24° C., or 25° C., or 26° C., or 27° C., or 28° C., or 29° C., or 30° C., or 40° C., or 50° C., or 60° C., or alternatively a pour point in a range of from about 15° C. to about 60° C., or about 15° C. to about 40° C., or about 15° C. to about 30° C., or about 15° C. to about 19° C.

In some embodiments, the oil phase of the permeate product stream has a pour point that is at least 2° C., or 5° C., or 10° C., or 15° C., or 20° C., or 25° C., or 30° C., or 35° C., or 40° C., or 45° C., or 50° C., or 55° C. or 60° C. lower than a pour point of the wax phase of the permeate product stream.

The permeate product stream from the membrane can have various improved properties including: reduced hetero atoms or polar molecules like sulfur or nitrogen, improved wax content, reduced microcarbon Residue and metals content, increased paraffinic (n- and iso-) and 1,2 ring naphthenes and 1,2 ring aromatics, reduced 3+ ring naphthenes and 3+ ring aromatics.

In some embodiments, the permeate product stream has a saturates content that is about at least 60 wt %, or at least 70 wt %, or at least 80 wt %, or at least 90 wt %, or alternatively in a range of from 60 wt % to 100 wt %, or from 70 wt % to 100 wt %, or from 70 wt % to 95 wt %, or from 80 wt % to 90 wt %, of the saturates content of the hydrocarbon feedstream; and at least 60 wt %, or at least 70 wt %, or at least 80 wt %, or at least 90 wt %, or alternatively in a range of from 60 wt % to 100 wt %, or from 70 wt % to 100 wt %, or from 70 wt % to 95 wt %, or from 80 wt % to 90 wt % of all paraffins from the hydrocarbon feedstream. The permeate product as compared to the hydrocarbon feedstream is reduced in the amount of aromatic molecules with a molecular weight greater than 500 by at least 30 wt %, or at least 40 wt %, or at least 50 wt %, or at least 60 wt %, or least 70 wt %, or least 80 wt %, or at least 90 wt %, or alternatively the amount of aromatic molecules with a molecular weight greater than 500 is in a range of from 40 wt % to 90 wt %, or from 50 wt % to 80 wt %, or from 60 wt % to 70 wt %. MCR in the permeate product is at least 30 wt %, at least 40 wt %, at least 50 wt %, at least 60 wt %, at least 70 wt %, at least 80 wt %, or at least 90 wt % lower than a micro carbon residue content of the hydrocarbon feedstream, or alternatively MCR in the permeate product is about 70 wt % to 95 wt %, or 80 wt % to 95 wt %, or 80 wt % to 90 wt %, as compared to the hydrocarbon feedstream. Inorganic metals, such as nickel, vanadium and other metals, are at least 30 wt %, or at least 40 wt %, or at least 50 wt %, or at least 60 wt %, or at least 70 wt %, or at least 80 wt %, or at least 90 wt % lower than an inorganic metals content of the hydrocarbon feedstream, or alternatively reduced by as much as 50 wt % to 99 wt %, or 60 wt % to 95 wt %, or 70 wt % to 90 wt %, or 70 wt % to 80 wt % as compared to the hydrocarbon feedstream. Although all of the percentages above are to the permeate product, it would be understood by a person of ordinary skill in the art to which the invention pertains that the complimentary percentages would apply to the retentate product, i.e. 85% in the permeate would correspond to 15% in the retentate, and so on. In some embodiments, an average boiling point of the permeate product stream is from 500 to 800° F., or from 500 to 700° F., or from 500 to 600° F., lower than an average boiling point of the feed and the retentate product stream.

The wax phase of permeate product stream is heavily concentrated in normal paraffins with significantly different properties than the oil phase (pour point, cloud point and boiling point). The wax product separated from the permeate product stream is commercially valuable, particularly for producing lube base stocks, which are presently made from expensive and declining conventional petroleum wax (obtained from solvent-based processing) and by catalytic processing or more recently from synthetic wax from Fisher-Tropsch processes. The wax product separated from the permeate product stream by the inventive method can be further purified to make high purity wax which can find applications in wide variety of products such as candles, cosmetic products, coverings for certain types of food products (such as cheese, fruits), hot melt adhesive formulations, and rubber tire formulations, for example, without limitation.

In certain embodiments, the wax product separated from the permeate product stream has a pour point of at least 15° C., or at least 16° C., or at least 17° C., or at least 18° C., or at least 19° C., or at least 20° C., or at least 21° C., or at least 22° C., or at least 23° C., or at least 24° C., or at least 25° C., or at least 26° C., or at least 27° C., or at least 28° C., or at least 29° C., or at least 30° C., or at least 40° C., or at least 50° C., or at least 60° C., or alternatively in a range of from about 15° C. to about 60° C., or about 15° C. to about 40° C., or about 15° C. to about 30° C., or about 15° C. to about 19° C.

In certain embodiments, the wax product separated from the permeate product stream has a boiling point in a range of from about 400° F. to about 2000° F., or about 500° F. to about 1800° F., or about 600° F. to about 1600° F., or about 800° F. to about 1400° F., or about 800° F. to about 1200° F.

Separating Methods

The inventive separation method of a wax product from a hydrocarbon feedstream comprises a membrane separation of the hydrocarbon feedstreams and a wax-oil separation of the permeate product stream.

Membrane Separation

To perform membrane separations on hydrocarbon feedstreams, such as raw crudes, the membranes utilized must be hydrocarbon resistant, meaning that they need to be able to maintain stability under severe operating conditions. Specifically, the membranes employed in the current process must be chemically stable in the liquid hydrocarbon environment. Raw crudes and crude fractions contain solvent range molecules such as benzene, toluene, xylenes, pentane, hexane, heptane, and other common hydrocarbon solvent mixtures like kerosene, Solvesso, A-200 etc. that could/will dissolve or embrittle non-hydrocarbon resistant membrane. Furthermore, raw crudes contain heavy molecules which oftentimes require elevated temperatures to ensure flowability of the feed. Thus, membranes used in the presently disclosed process should also have good thermal integrity. The term "membrane" as used herein, refers to organic membranes (for example, polymeric membranes); inorganic membranes (for example, metallic, silica, ceramic, carbon, graphene, zeolite, MOF, oxide or glass membranes); supported-liquid or facilitated transport membranes; hybrid or mixed-matrix membranes comprised of inorganic particles (for example, zeolite, carbon, metal and metal oxides) as the dispersed phase and a polymer matrix as the continuous phase materials, and combinations thereof.

According to an embodiment, the membrane is a polymeric membrane, a ceramic membrane, a sintered metal membrane, a carbon membrane, or a combination thereof.

In some embodiments, the polymeric membranes include a polymer, for example, a homopolymer, a copolymer, a polymer blend, or combinations thereof. The polymer may be selected from, e.g., cellulose acetate (CA), polysulfones regenerated cellulose, cellulose triacetate, polyether sulfones, polyetherimide, polyvinylidenefluoride, aromatic polyamides, aliphatic polyamides, polyimides, polyamideimides, polyetherimides, polyetheresters, polysulfones, polybenzimidazoles, polybenzoxazoles, polyacrylonitrile, polyaromaticpolyamide imides, polyamide esters, polyesters, perfluoropolymers, etc., and combinations, copolymers, and substituted polymers thereof... nitrile rubber, neoprene, polydimethylsiloxane and related silicone polymers, chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, polyamide-polyether block copolymers, styrene/butadiene/styrene block copolymers, styrene/ethylene/butylene block copolymers, and thermoplastic polyolefin elastomers.

The term "ceramic" as utilized herein is defined as any hard, brittle, heat-resistant and corrosion-resistant material made by mixing, shaping and then firing to elevated temperatures a nonmetallic mineral or combination of minerals. Some preferred examples of ceramics and ceramic membrane modules that can be used in the present disclosure include, but are not limited to, monoliths, membranes, tubes, discs, sheets, layered structures, and other geometrical configurations known to those well versed in the state of the art. Preferred ceramics as used in the present disclosure are selected from materials comprised from clays, titania, silica, alumina, cordierite, ferric oxide, boron nitride, zirconia, zeolitic materials, glass, silicon carbide, layered mineral structures, kaolinite, earthen ware materials, $SO_2/Fe_2O_3$, composites, layered structures comprising a combination of materials, foamed structures comprising a combination of materials, honey-combed configurations comprising a combination of materials, silicon nitride, solgel materials, steatite, porcelain, perovskites, macroporous and mesoporous materials, carbons, mixed matrix materials, and combinations thereof. Most preferably, the ceramics as used in the present disclosure are selected from materials comprised from clays, titania, silica, alumina, cordierite, ferric oxide, boron nitride, zirconia, zeolitic materials, glass, and silicon carbide. The ceramic membranes disclosed herein may also be functionalized as described in U.S. Pat. No. 8,845,886 which is incorporated by reference in its entirety.

Form factor of the membranes can be flat sheet, spiral wound, tubular, hollow fiber, monolithic (multi-channel), coated tube, composite membrane configurations, or combinations thereof.

The membranes of the present invention have a pore size of about 0.3 nm to about 100 nm. According to various embodiments, the membranes have a pore size of 0.3 nm to 80 nm, or 0.3 nm to 70 nm, or 0.3 nm to 60 nm, or 0.3 nm to 50 nm, or 0.3 nm to 40 nm, or 0.3 nm to 30 nm, or 0.3 nm to 20 nm, or 0.3 nm to 15 nm, or 0.3 nm to 10 nm, or 0.3 nm to 5 nm, or 0.3 nm to 2 nm. When measured in kilodaltons, the present invention contemplates membranes with a pore size of 0.01 kD to about 800 kD. According to various embodiments, the membranes have a pore size of 0.02 kD to about 700 kD, or 0.03 kD to about 600 kD, or 0.04 kD to about 500 kD, or 0.05 kD to about 400 kD, or 0.06 kD to about 300 kD, or 0.08 kD to about 200 kD, or 0.09 kD to about 200 kD, or 0.1 kD to about 500 kD, or 0.1 kD to about 200 kD, or 0.1 kD to about 100 kD, or 0.1 kD to about 50 kD, or 0.1 kD to 8 kD. According to an embodiment, the membranes allow molecules to pass through the pores based on its size, for example, 3+ ring aromatics or naphthenes could get rejected while a 1,2 ring aromatic or naphthene could pass through or a paraffinic molecule could as well. Alternatively, a membrane could allow molecules to pass based on its solubility or aromaticity. In this case a non-aromatic molecule like a paraffin or naphthene could be rejected while a large aromatic molecule could pass through the membrane. Either type of membrane could be used here. If a size based separating membrane is used, the permeate is the desired product, and if a solubility based separating membrane is used, the retentate is the desired product.

Conditions can be adapted to "push" various amounts of feed through the membrane. For example, the process can be run such that at least 5% of the feed by weight permeates the membrane, for example, at least 10%, or at least 15%, or at least 20%, or even at least 90% of the feed permeates the membrane. This can be adjusted by altering temperature and/or transmembrane pressure. It should be understood by a person of skill in the art that the greater percentage of feed permeates the membrane, the less refined of fractions that the membrane will be able to produce.

According to certain embodiments of the present invention, the push pressure, the pressure that the feed is under when it contacts the membrane is about 5 psig to about 7000 psig, or about 10 psig to about 3000 psig, or about 20 psig to about 3000 psig, or about 50 psig to about 3000 psig, or about 100 psig to about 3000 psig, or about 200 psig to about 3000 psig, or about 200 psig to about 1500 psig, or about 200 psig to about 1000 psig.

According to various embodiments, the transmembrane pressure (or pressure drop), the pressure across the membrane is about 2 psig to about 2000, or about 5 to about 2000 psig, or about 100 to about 1500 psig.

According to various embodiments of the present invention, the operating temperature of the membranes is at least 15° C., or at least 20° C., or at least 30° C. or at least 40° C. or at least 50° C. or at least 60° C. or at least 65° C. or at least 70° C. The operating temperature of the membrane is higher than the pour point of the wax. According to an embodiment, the pour point of the wax in the feed is up to 59° C., and the operating temperature of the membrane is 60° C. to about 400° C., or about 60° C. to about 300° C. The operating temperature for the wax and oil separation unit is lower than the pour point of the wax. According to an embodiment, if the pour point of the wax is at least 15° C., then the wax and oil separating phase is run at an operating temperature of less than 15° C.

Flux through the membrane can vary depending on the membrane pore size and test conditions. According to an embodiment, the flux is in the range of 1-5 gallons/ft$^2$·day. According to another embodiment, the flux is up to and including 20 gallons/ft$^2$·day.

According to an embodiment, the membranes are operated in pressure mode (such as nanofiltration or reverse osmosis), pervaporation mode, forward osmosis mode or any combination thereof.

The membrane separation process comprises: i) contacting the hydrocarbon feedstream on a first side of the membrane; ii) retrieving the retentate stream from the first side of the membrane, and retrieving the permeate stream from a second side of the membrane. An embodiment of the separation process for the raw crude utilizing a membrane is illustrated in FIG. 1. Here, a hydrocarbon feedstream (1) is fed to a membrane separation unit (5) which contains one or more membrane elements. The membrane separation unit (5) contains a membrane element (10), a retentate zone (15) wherein the raw crude (1) contacts a first side of membrane (10), and a permeate zone (20), from which at least one permeate stream (25) is obtained from the opposite or second side of membrane (10). Such permeate stream (25) obtained is comprised of materials that selectively permeate through the membrane element (10). In certain embodiments, the hydrocarbon feedstream may be flowed across the face of the membrane element(s) in a "cross-flow" configuration. In this configuration, in the retentate zone (15), the hydrocarbon feedstream (1) contacts one end of the membrane element (10) and flows across the membrane, while a retentate product stream (30) is withdrawn from the other end of the retentate zone (15). As the hydrocarbon feedstream/retentate flows across the face of the membrane, a composition selective in saturated compounds content flows through the membrane to the permeate zone (20) wherein it is drawn off as a permeate stream (25). In a cross-flow configuration, it is preferable that the Reynolds number in at least one retentate zone (15) of the membrane separations unit (5) be in the turbulent range, preferably above about 2000, and more preferably, above about 4000. In some embodiments, a portion of a retentate stream obtained from the membrane separation units may be recycled and mixed with the raw crude to the membrane separations unit prior to contacting the active membrane.

Continuing with FIG. 1, the present disclosure utilizes a separation process to separate the hydrocarbon feedstream into at least one permeate product stream (25) and at least one retentate product stream (30) is drawn from the retentate zone (15) of the membrane separation unit (5). It should be understood that depending upon more complex arrangements such as multiple internal stages, series or parallel multiple unit operations, and/or separation unit configurations knowledgeable to those skilled in the art, that more than one membrane element and/or separation zone may be utilized and that more than one permeate stream and/or retentate stream may be obtained from the membrane separation unit (5). Additionally, the retentate stream (30), permeate product stream (25) or any portions thereof may be recycled to the primary retentate zone or any intermediate retentate zone.

The present invention contemplates that membranes are positioned in a single membrane unit (stage) or in several units, wherein each unit may be comprised of one or more separate membranes. In various embodiments, the number of membrane units depends on the surface area of the separate membranes in combination with the required quantity of steam to be permeated. The membrane units may include membranes of the same type, or a different type, in terms of composition or configuration. As a consequence, the membrane units may differ from each other, in terms of one or more of shape, permeance, permselectivity, or surface area available for permeation. Furthermore, the membranes may be arranged in series or in parallel, for example.

Wax-Oil Separation

Various methods for separating the wax phase in the permeate stream from the oil phase in the permeate stream are contemplated by the present invention.

According to various embodiments, the present invention provides a wax-oil separation unit for separating a wax product from the wax phase of permeate product stream. Wax-oil separation units include, for example, centrifuges, wax filters, crystallizers, cyclones, fluid extraction devices, solvent dewaxing devices and any combinations thereof, without limitation.

Separation Apparatuses

The apparatus for separating a wax product from a hydrocarbon feedstream comprises a membrane separation unit (5) and a wax-oil separation unit (45). FIGS. 2-6 schematically illustrate some examples of the apparatus of the present invention.

Figure 2:
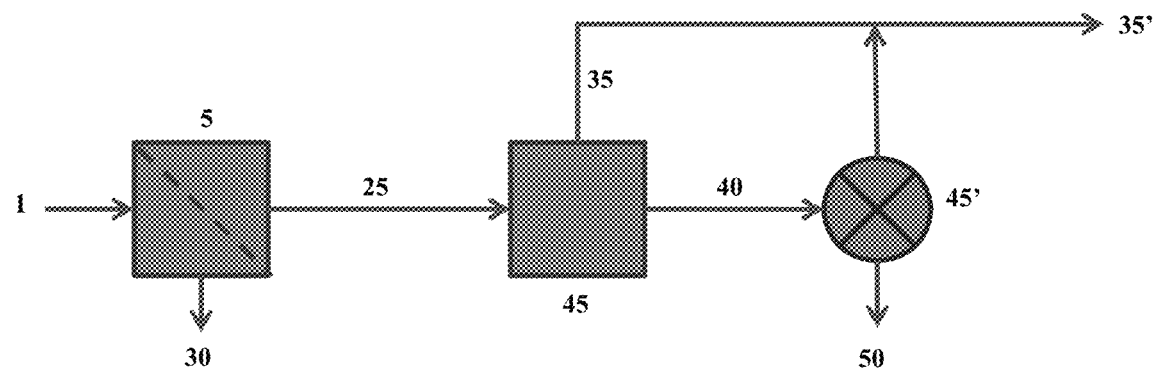
FIG. 2 schematically shows an example of an apparatus according to an embodiment of the invention.

According to FIG. 2, a single membrane separation is provided, where the apparatus further comprises a wax-oil separation unit (45). A hydrocarbon feedstream (1) is fed to a membrane separation unit (5) which contains a membrane element. Upon the membrane separation, a permeate product stream (25) is obtained from the second side of the membrane element (the side opposite of the side where the stream enters the membrane), a retentate product stream (30) is obtained from the first side of the membrane element. The permeate product stream (25) is subsequently separated through a wax-oil separation unit (45), which is an exemplary wax-oil separation unit, and the wax phase (40), the oil phase (35) are obtained. The wax phase (40) still has oil and is further separated through a second wax-oil separation unit (45'). According to an embodiment, after the separation, the wax phase (50) is about 13% by volume and the final oil phase (35') is about 77% by volume.

Figure 3:
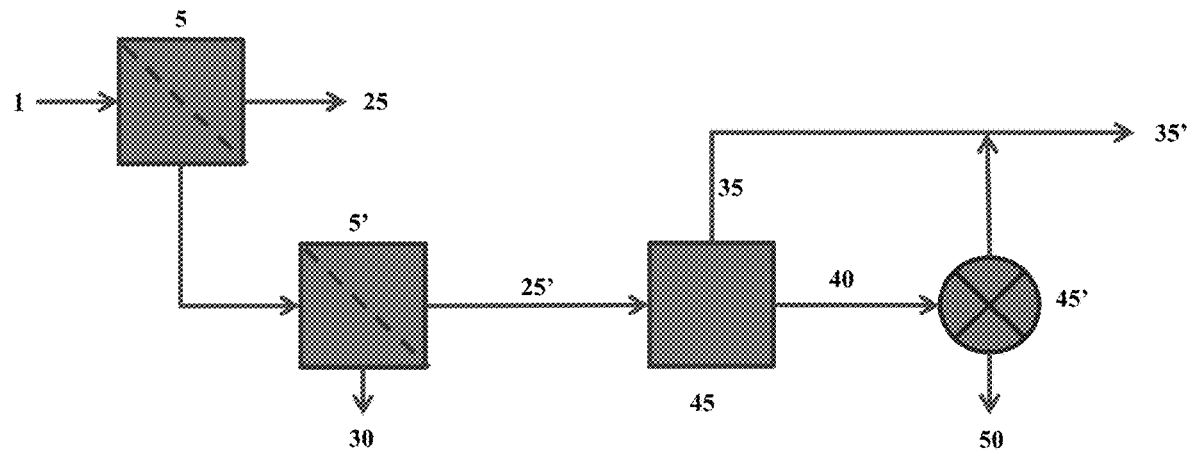
FIG. 3 schematically shows an example of an apparatus according to an embodiment of the invention.

According to FIG. 3, a two staged membrane separation (including two membrane separation units (5) and (5'), which are arranged in sequence) is provided. A hydrocarbon feedstream (1) is fed to membrane separation unit (5) where it is separated into a permeate (that material that passes through the membrane) which is a hydrocarbon feedstream containing light ends (25) and the retentate (the material that does not pass thought the membrane) which is a hydrocarbon feedstream that is directed to a second membrane separation unit (5'). According to an embodiment, the light ends are directly sent to a light ends unit in a refinery. Removing such light ends in the first stage membrane separation is advantageous as it allows faster wax separation comprising larger paraffins leading to higher and better quality wax obtained with less volume to process through the separation. After the second stage membrane separation in membrane separation unit (5'), a permeate product stream (25') is obtained from the side of the separation unit (5') opposite the side that the stream enters the unit. The permeate product stream (25') is subsequently separated through a wax-oil separation unit (45), and a wax phase (40), and an oil phase (35) are obtained. The wax phase (40) still has oil and is further separated through a wax-oil separation unit (45'). According to an embodiment, after the separation, the wax phase (50) is about 15% by volume and the final oil phase (35') is about 55% by volume.

Figure 4:
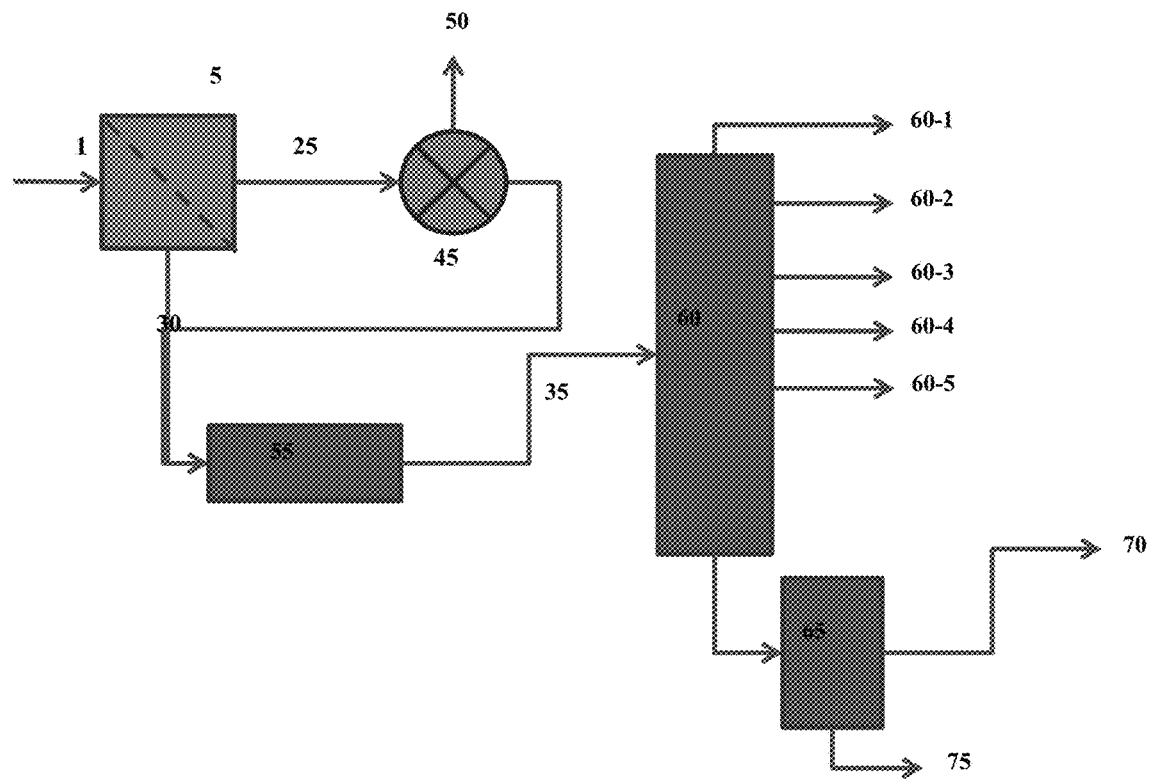
FIG. 4 schematically shows an example of an apparatus according to an embodiment of the invention.

In one embodiment as shown in FIG. 4, light crude oil (1) is fed to a membrane separation unit (5), where permeate product stream (25) and a retentate product stream are obtained. The permeate product stream (25) is subsequently separated through a wax-oil separation unit (45) into a wax phase (50) and a filtrate stream for further processing. The filtrate stream from the wax-oil separation unit (45), and the retentate product stream from the membrane separation unit (5), are combined as a single retentate stream (30) and further processed through the refinery as a normal crude. The combined stream is heated in a furnace (55), and then the combined stream from the furnace (35) is fed to an atmospheric pipe still (APS) (60) followed by a vacuum pipestill (VPS) (65). The APS (60) separates the stream into light naphtha (60-1), heavy naphtha (60-2), kerosene (60-3), light gas oil (60-4), and heavy gas oil (60-5) and the remaining volume is an atmospheric resid stream. The atmospheric resid stream from the APS is then fed to the VPS (65), and is separated into a vacuum gas oil (70) and a vacuum resid (75). According to various embodiments, the wax separation occurs in an oil production facility or at a refinery. According to an embodiment, wax separation is performed at the refinery, thereby increasing the refinery throughput by 13-15%.

Figure 5:
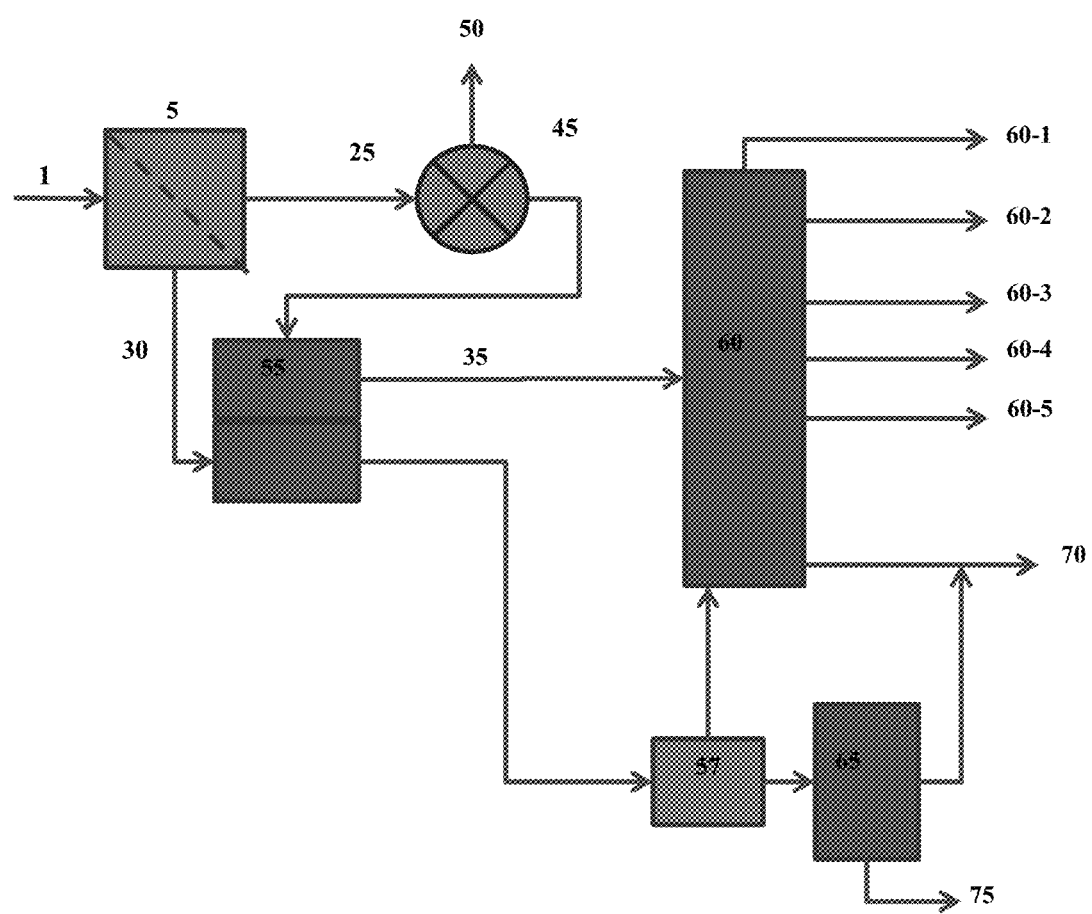
FIG. 5 schematically shows an example of an apparatus according to an embodiment of the invention.

In another embodiment, as shown in FIG. 5, light crude oil (1) is fed to a membrane separation unit (5), where a permeate product stream (25) and a retentate product stream (30) are obtained. The permeate product stream (25) is subsequently separated through a wax-oil separation unit (45) into a wax phase (50) and a remaining filtrate stream. The retentate stream (30) and the remaining filtrate stream from the wax-oil separation unit (45) are separately directed to and heated in a furnace (55) and then the heated filtrate stream (35) from the furnace (55) is fed to an atmospheric pipe still (APS) (60) and the retentate stream (30) from the furnace is fed to a flash (57) and then to a vacuum pipestill (VPS) (65). The APS (60) separates the heated filtrate stream (35) from the furnace (55) into a light naphtha (60-1), heavy naphtha (60-2), kerosene (60-3), light gas oil (60-4), and heavy gas oil (60-5). The flash (57) reduces the pressure of the retentate stream (30) from the furnace to direct further flashing or vaporization of light molecules to the APS (60) and the remaining stream as a feed to the VPS (65). The VPS (65) then separates the remaining steam into a vacuum gas oil (70) and a vacuum resid (75). According to an embodiment, about 13-20% of the feed crude oil can be obtained as wax and throughput increase of 25% is possible for refinery front end distillation.

Figure 6:
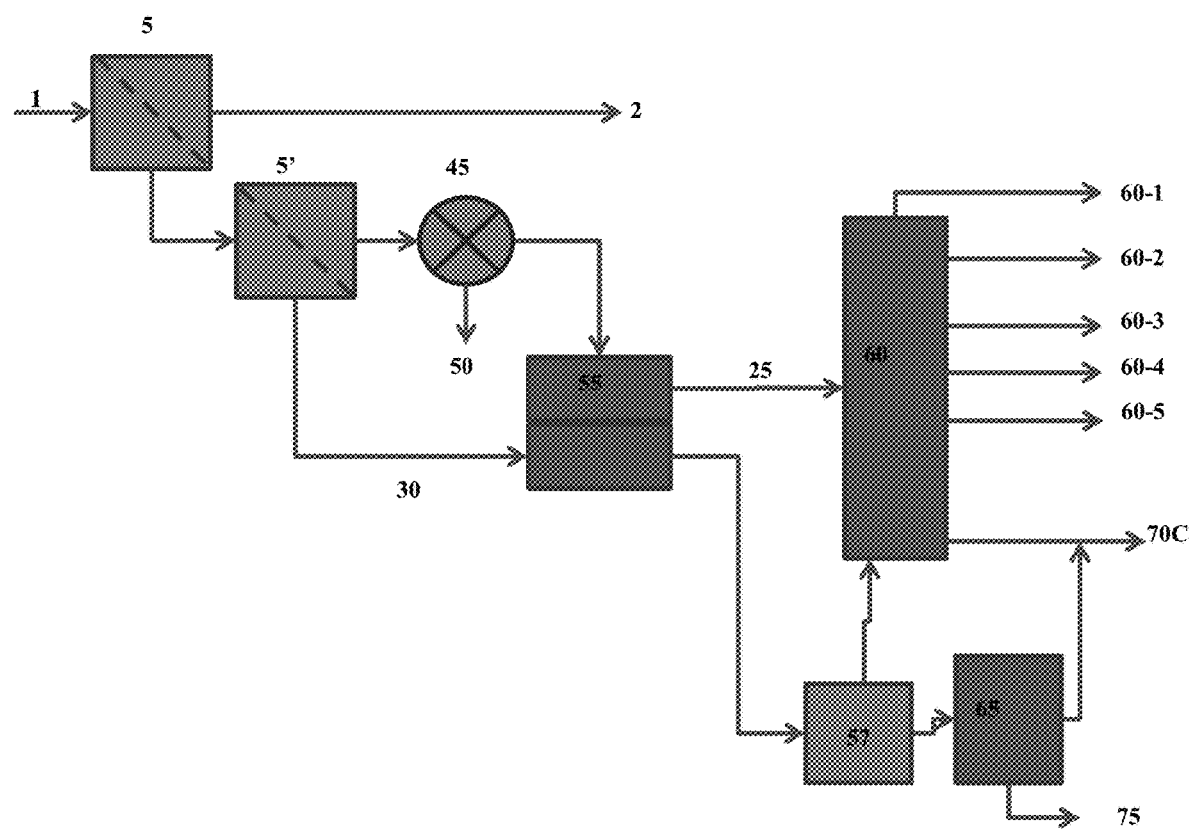
FIG. 6 schematically shows an example of an apparatus according to an embodiment of the invention.

In another embodiment as shown in FIG. 6, a two-staged membrane separation arranged in sequence is used to remove the light ends in a first stage to enrich the wax content of the separated permeate from a second stage. Light crude oil (1) is fed to a membrane separation unit (5), where a light ends stream (2) is separated in the first stage separation, and the remaining stream is directed to a second membrane separation unit (5'). At the second membrane separation unit (5'), the stream is separated into a retentate product stream (30) and a permeate stream (25) that is subsequently directed to a wax-oil separation unit (45), where a wax phase (50) is separated out leaving a filtrate stream of the permeate stream (25).

The retentate product stream (30) and the filtrate stream of the permeate stream (25) from the wax-oil separation unit (45) are separately directed to and heated in a furnace (55) and then the heated filtrate stream (25) from the furnace (55) is fed to an atmospheric pipe still (APS) (60) and the heated retentate stream (30) from the furnace is fed to a flash (57) and then to a vacuum pipestill (VPS) (65). The APS (60) separates the heated filtrate stream (25) from the furnace (55) into a light naphtha (60-1), heavy naphtha (60-2), kerosene (60-3), light gas oil (60-4), and heavy gas oil (60-5). The flash (57) reduces the pressure of the retentate stream (30) from the furnace to direct further flashing or vaporization of light molecules to the APS (60) and the remaining stream as a feed to the VPS (65). The VPS (65) then separates the remaining steam into a vacuum gas oil (70) and a vacuum resid (75).

Some distillate quality molecules are recovered from the retentate stream (30) from the furnace by subjecting it to a flash (57) using available pressure of the retentate stream (30). From the APS (60), light naphtha (60-1), heavy naphtha (60-2), kerosene (60-3), light gas oil (60-4), and heavy gas oil (60-5) are obtained. From the VPS (65), a vacuum gas oil (70) and a vacuum resid (75) are obtained. This embodiment allows for a possible throughput increase of 50% for refinery distillation frontend.

EXAMPLES

The examples below are provided to illustrate the improved permeate product qualities and the benefits from specific embodiments of the present disclosure for a hydrocarbon feedstream separation via membranes and operating conditions of the present invention. These Examples only illustrate specific embodiments of the present invention and are not meant to limit the scope of the present invention.

Example 1: Paraffin Rich Wax and Oil Phase Separation of Eagle Ford Raw Crude Feed Using a Ceramic Membrane Eagle Ford raw crude (API density is 42.4) was utilized as the hydrocarbon feedstream to the separation method. The feed was permeated in a batch membrane process using a 47 mm diameter 8 kD cut off (or 2 nm nominal pore size) membrane. The ceramic membranes have 2.5 mm thickness and are made up of a $TiO_2$ support layer and a $TiO_2$ active layer. The support layer comprises about 80-90 wt % of the membrane and the active layer is about 10-20 wt %. In the batch experimental process, 120 g of the hydrocarbon feed was added to a batch cell, the membrane was mounted at the bottom of the cell and ensured that it was sufficiently free of leaks or defects. The transmembrane pressure was held at 400 psig and the feed temperature was held at about 212° F. (100° C.) assisted with constant stirring at 400 rpm with a mechanical stirrer. Permeate samples then travelled through a heated permeate sample line and were collected in vials at ambient temperature (~20° C.). Selected permeate samples and a retentate sample were extracted during the test along with flux rates and permeate yields measurement. One permeate sample was collected at 90 wt % yield. The permeate stream had two distinct phases, i.e. a wax phase and an oil phase at ambient conditions. The permeate-composite stream with the two phases was further separated by a centrifuge.

Figure 7:
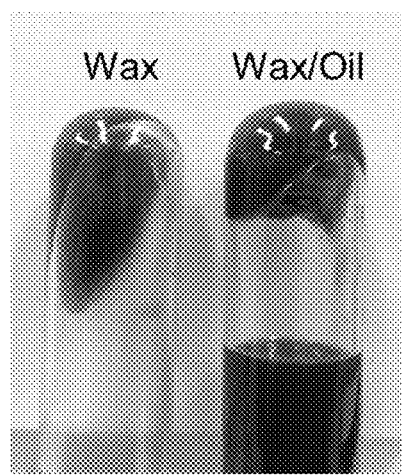
FIG. 7 shows a picture of permeate products from separation of Eagle Ford raw crude (wax and oil phases are separated and indicated) through an exemplary 8 kD molecular weight cut-off (MWCO) ceramic membrane.
Figure 8:
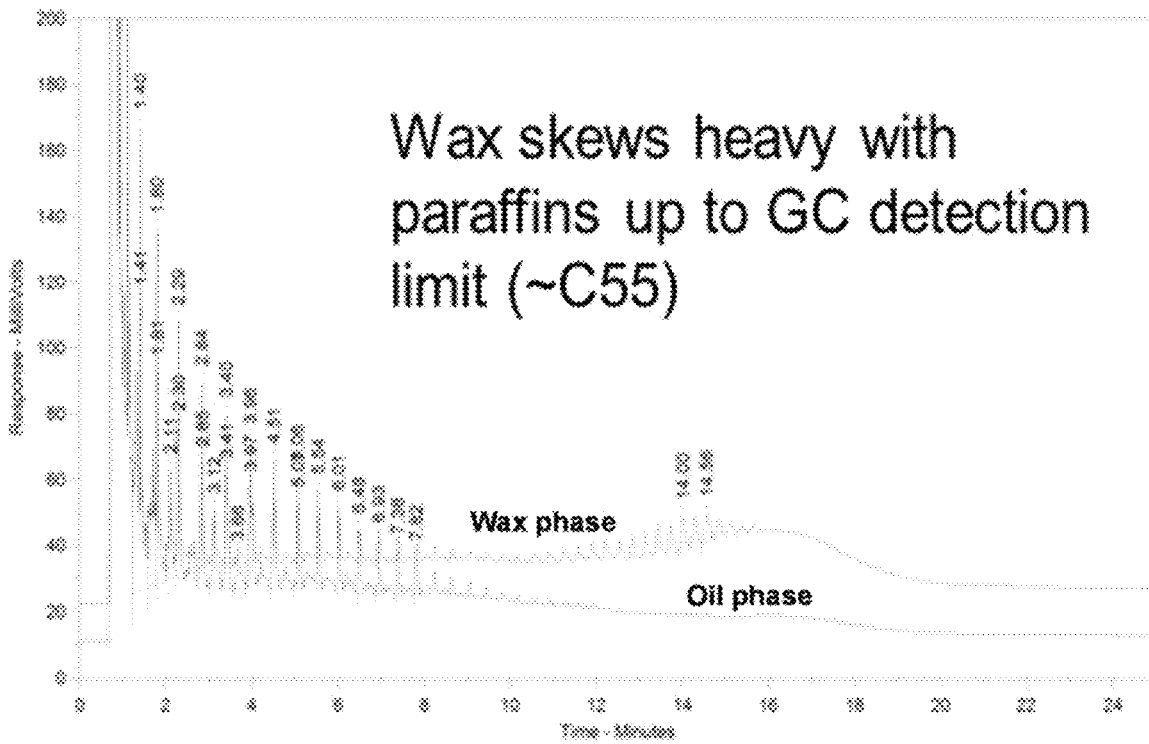
FIG. 8 provides a gas chromatography (GC) analysis of wax and oil phases of the permeate product from Eagle Ford raw crude and an 8 kD molecular weight cut-off (MWCO) ceramic membrane showing greater distribution of higher n-paraffins in wax phase.

Permeate-composite, permeate-wax and permeate-oil phase, feed and retentate samples were then analyzed. FIG. 7 shows a picture of permeate product stream from membrane separation of Eagle Ford raw crude, where the wax and oil phases are separated by wax settling and the centrifuge. FIG. 8 shows gas chromatograph (GC) data of wax and oil phases of the permeate product from the Eagle Ford raw crude indicating linear paraffins skewing heavily into the wax phase with n-paraffin peaks observed up to C=55 (detection limit of the GC). This is a clear indication of the highly paraffinic nature of the wax phase. The pour point and cloud point of the wax phase were 59° C. and 58° C. respectively. While the pour and cloud points of the oil phase were 15° C. and 19° C. respectively, and thus one can see the pour point and the cloud point of the wax phase is higher than the oil phase of the permeate. While not being bound by theory, it is desirable to run the membrane at a temperature higher than the pour point of the wax phase to allow it to melt and permeate through the membrane while it is desired to collect the sample at a temperature higher than the pour point of the oil phase while lower than the pour point of the wax phase to enable the phase separation.

Figure 9:
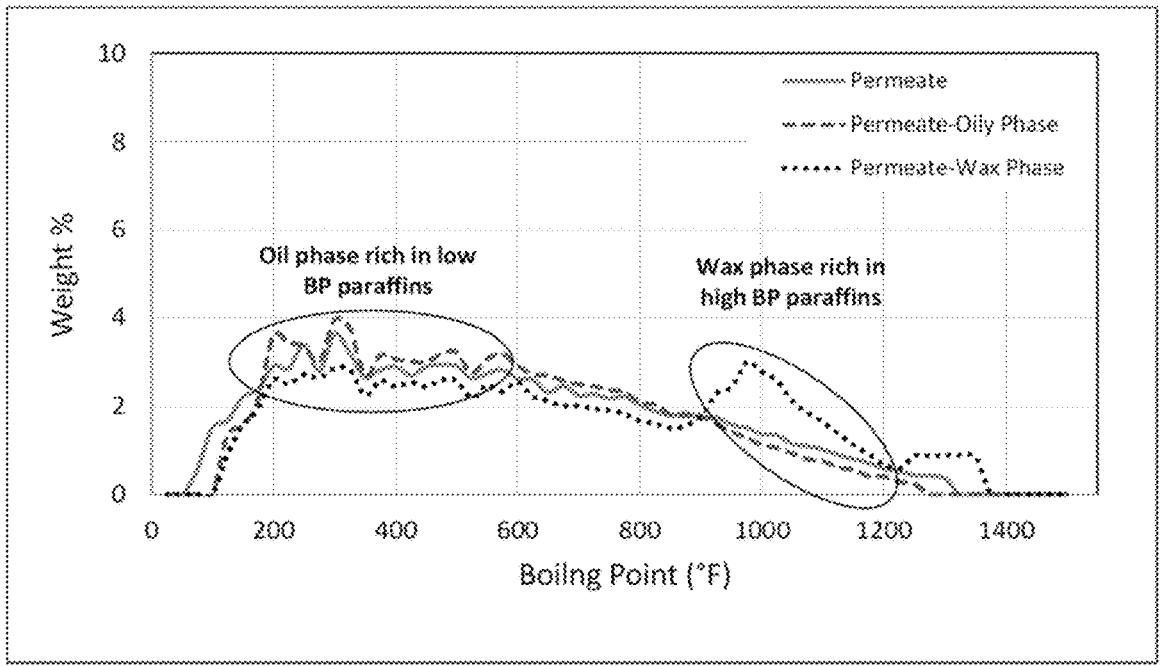
FIG. 9 provides a differential simulated distillation (SIMDIS) plot showing an enrichment of high boiling, long chain paraffins in the wax phase (vs. composite permeate and oil phase) and an enrichment of lower boiling paraffin molecules in the oil phase (vs. composite permeate and wax phase).

FIG. 9 shows a SIMDIS plot showing an enrichment of high boiling, long chain paraffins in the wax phase of the permeate sample (vs. permeate-composite and oil phase of the permeate) while an enrichment of lower boiling solvent range paraffin molecules is observed in the oil phase of the permeate sample (vs. permeate-composite and wax phase of the permeate).

When FIGS. 8 and 9 are combined, it can be concluded that wax phase of the permeate sample has higher boiling molecules which are higher carbon number paraffins, while the oil phase has lower boiling point molecule which are lower carbon number paraffins. Usually higher carbon number molecules have a higher boiling point.

Figure 10:
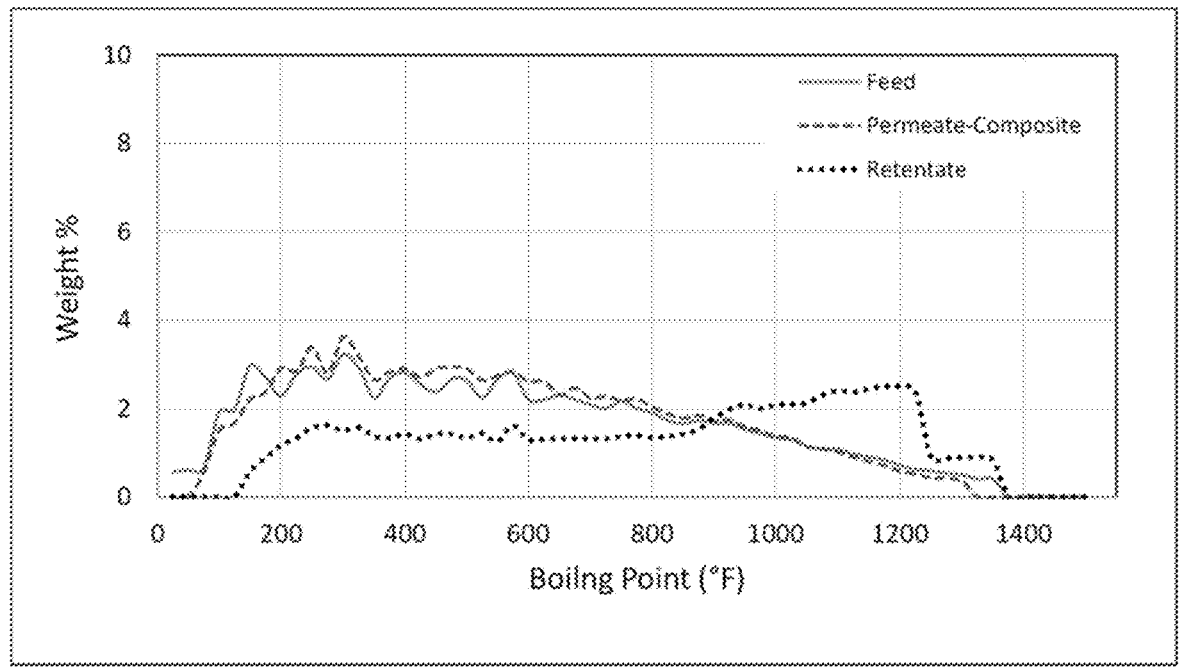
FIG. 10 provides a differential simulated distillation (SIMDIS) plot showing a reduction in low boiling molecules and an increase in high boiling molecules in the retentate with respect to Eagle Ford raw crude and the permeate.
Figure 11:
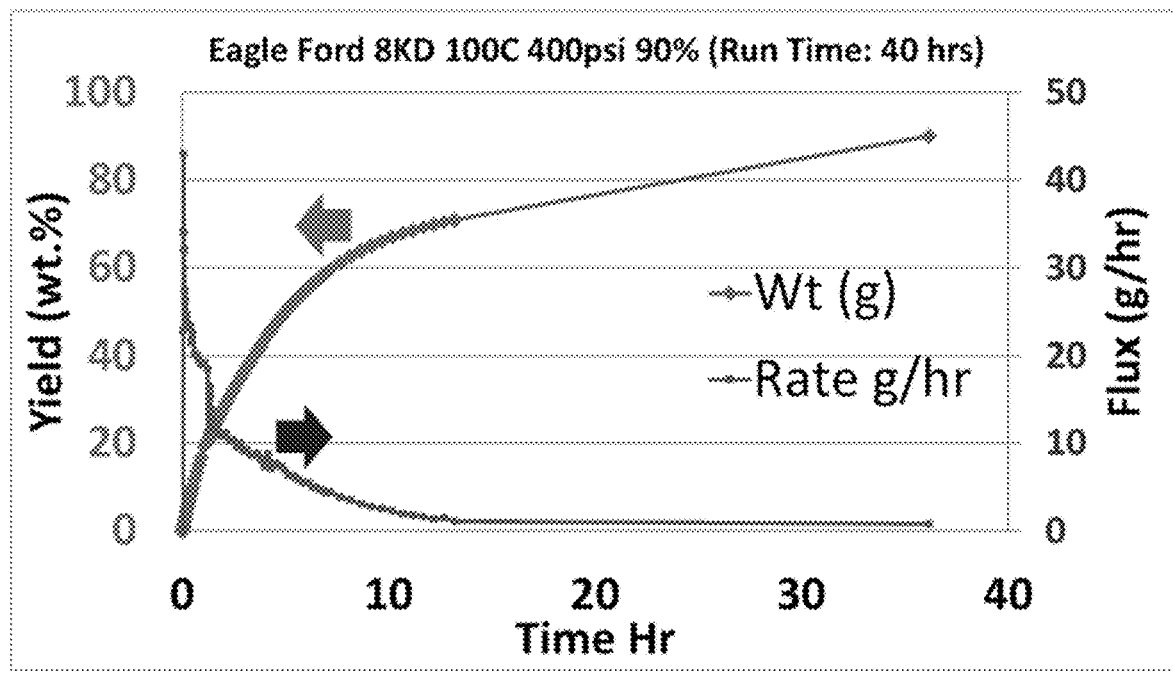
FIG. 11 provides changes in flux and yield of an exemplary 8 kD ceramic membrane with the time.

FIG. 10 shows a SIMDIS plot showing an overall reduction in low boiling molecules and an increase in high boiling molecules in the retentate with respect to the hydrocarbon feedstream and the permeate.

Table 1 shows the reduction of microcarbon residue (MCR) in the permeate and enhancement of MCR in the retentate. The MCR result shows that the membrane is able to reject large microcarbon molecules and the permeate has a much lower MCR content. Combining FIG. 10 and Table 1 it is hypothesized that the high boiling molecules in the retentate stream are multi-ring aromatic or asphaltenic molecules, without intending to be bound by theory.

TABLE 1

Reduction of MCR in the permeate and enhancement of MCR in the retentate

| | MCR (wt. %) |
| --- | --- |
| Feed | 1.38 |
| Permeate | 0.43 |
| Retentate | 0.91 |

Example 2: Paraffin Rich Wax and Oil Phase Separation of Arab Light Raw Crude Feed Using a Perfluoro Polymer Membrane Arab Light raw crude (API density is 21.5) was utilized as the hydrocarbon feedstream to the separation method. The feed was permeated in a batch membrane process using a 47 mm diameter asymmetric amorphous perfluoropolymer membrane coupon with a molecular weight cut off between 300-400 Daltons (nominal pore size <1 nm). In the batch experimental process, 207 g of hydrocarbon feed was added to a batch cell, the membrane was mounted at the bottom of the cell and ensured that it was sufficiently free of leaks or defects. The transmembrane pressure was held at 600 psig and the feed temperature was held at about 212° F. (~100° C.) assisted with constant stirring at 400 rpm with a mechanical stirrer. Permeate samples then travelled through a heated permeate sample line and were collected in vials at ambient temperature (~20° C.). Selected permeate samples and a retentate sample were extracted during the test along with flux rates and permeate yields measurement. Two permeate samples were collected at 5 and 10 wt. % yields respectively.

Table 2 shows the rejection of microcarbon residue (MCR) in the permeate and enhancement of MCR in the retentate. It can be seen that the MCR in the permeate is zero.

TABLE 2

Rejection of MCR in the permeate and enhancement of MCR in the retentate

| | MCR (wt. %) |
| --- | --- |
| Feed | 9.3 |
| Permeate 5 wt % | 0 |
| Permeate 10 wt % | 0 |
| Retentate | 9.3 |

Figure 12:
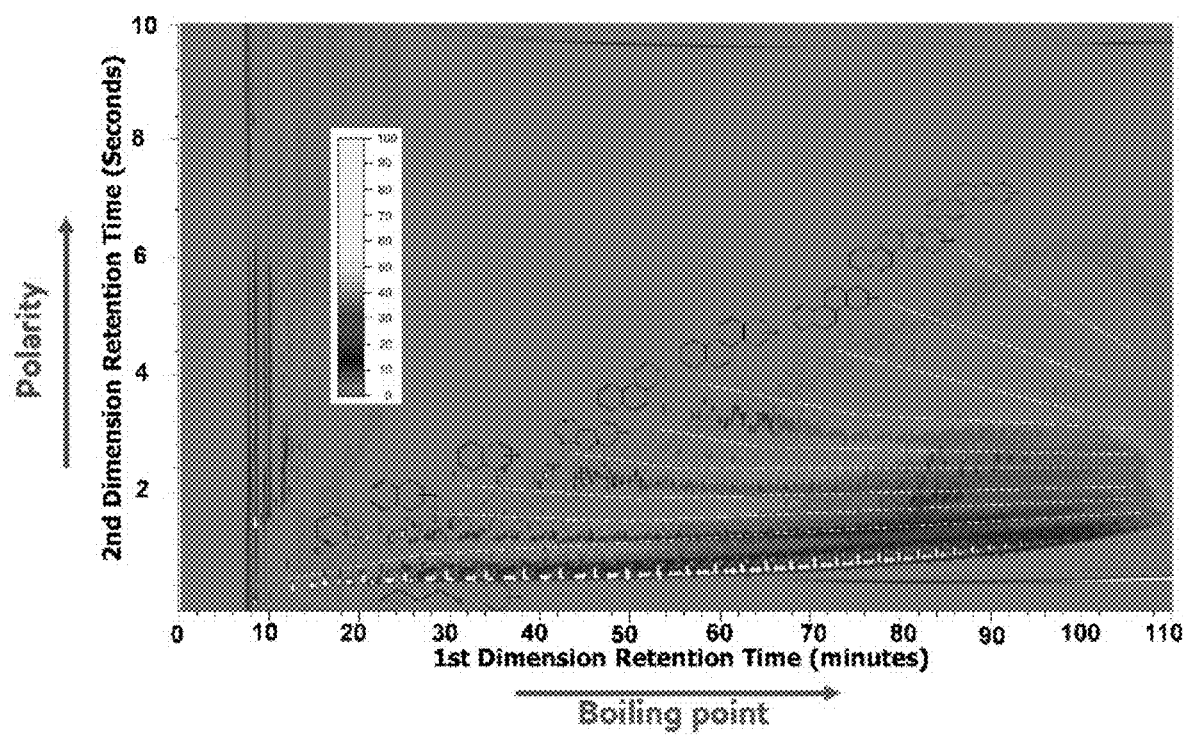
FIG. 12 provides a two-dimensional gas chromatography (2D-GC) plot of the Arab Light raw crude 1050° F.—fraction showing the range of molecules from saturates to multi-ring aromatics.

FIG. 12 provides a two-dimensional gas chromatography (2D-GC) plot of the Arab Light raw crude 1050° F.—fraction showing the range of molecules from saturates to multi-ring aromatics, where X-axis can be related to the boiling point of the molecules while the Y-axis can be related to the type or polarity of the molecule.

Figure 13:
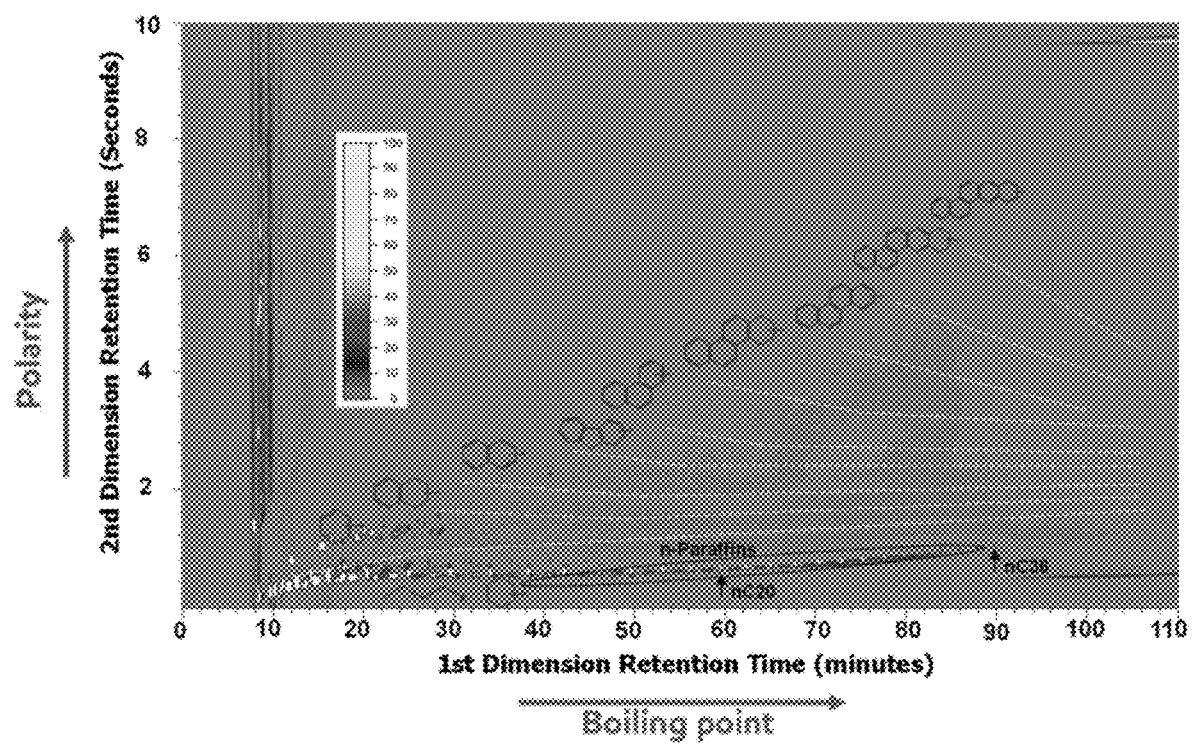
FIG. 13 provides a two-dimensional gas chromatography (2D-GC) plot of 5 wt. % permeate showing the membrane preferentially allows light molecules (<C8) and saturates (paraffins and naphthenes) while rejecting most of single and multi-ring aromatics.

FIG. 13 provides a two-dimensional gas chromatography (2D-GC) plot of 5 wt. % permeate showing that the membrane preferentially allows light molecules (<C8) and saturates (paraffins and naphthenes) while rejecting most of single and multi-ring aromatics, where X-axis can be related to the boiling point of the molecules while the Y axis can be related to the type or polarity of the molecule. It can be seen that the 5 wt. % permeate is preferentially rich in n-paraffin molecules which are highly desirable for wax production with negligible iso-paraffins observed. Location of linear paraffins n-C20 and n-C36 are shown in the figure for reference.

Figure 14:
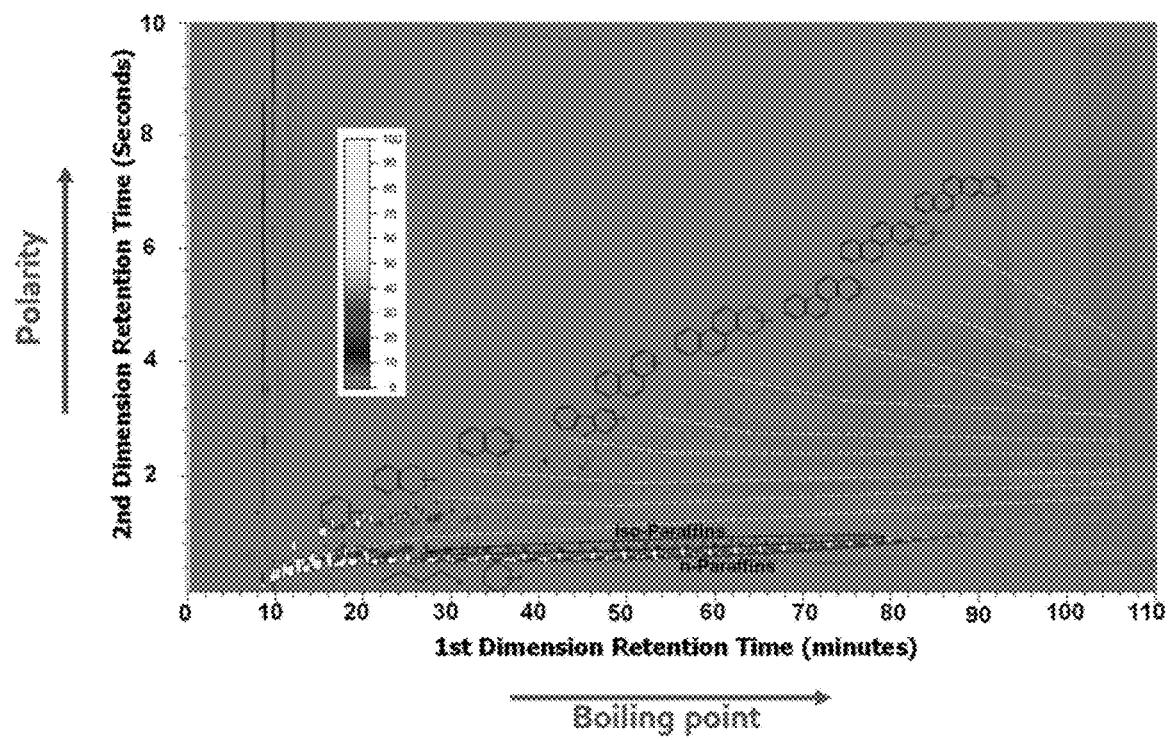
FIG. 14 provides a two-dimensional gas chromatography (2D-GC) plot of 10 wt. % permeate from an Arab Light raw crude feed and a perfluoro polymer membrane showing that the membrane preferentially allows lights (<C8) and saturates (paraffins and naphthenes) while rejecting most of single and multi-ring aromatics.

FIG. 14 provides a two-dimensional gas chromatography (2D-GC) plot of 10 wt. % permeate showing that the membrane preferentially allows lights (<C8) and saturates (paraffins and naphthenes) while rejecting most of single and multi-ring aromatics, where X-axis can be related to the boiling point of the molecules while the Y axis can be related to the type or polarity of the molecule. The 10 wt. % permeate can be seen to have some molecules in the iso-paraffin range which are observed right above the n-paraffin molecules. The yield-purity trade-off can be observed with the lower yields (5 wt. %) providing the highest enrichment of lower boiling point (and likely smaller/lighter) species and a significant enrichment of n-paraffin molecules. As higher yields are pushed through the membranes (10 wt. %) the purity of permeate goes down and iso-paraffin molecules are observed in the permeate.

Figure 15:
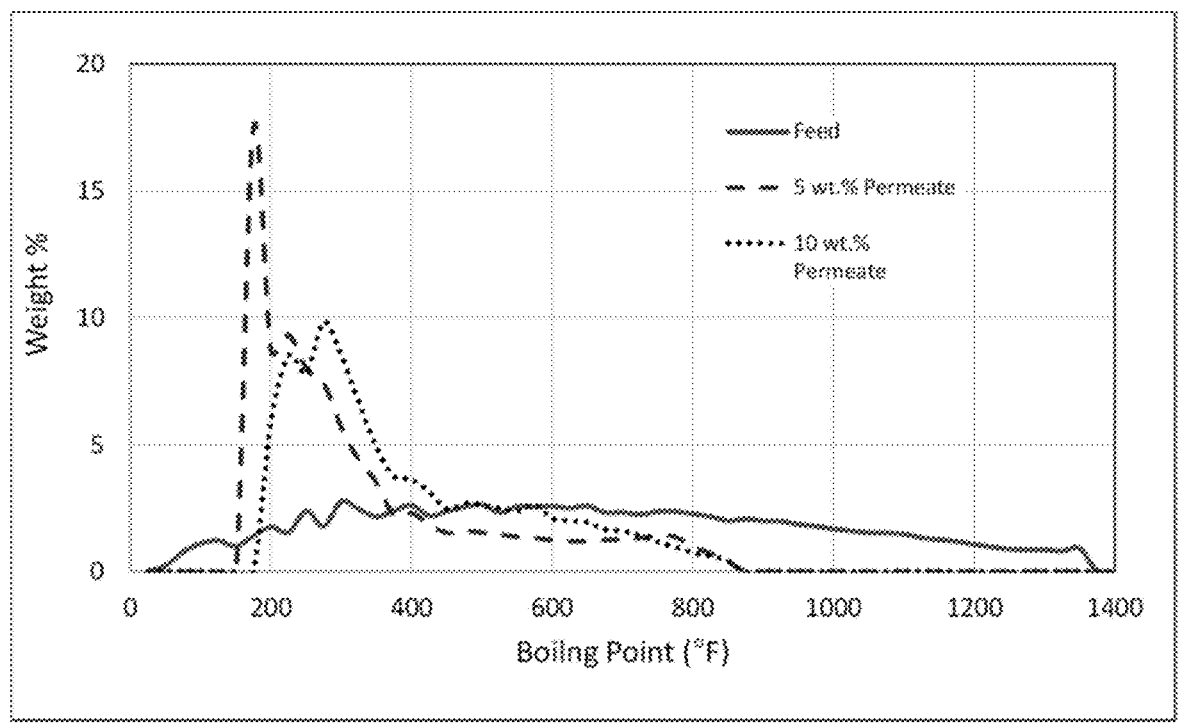
FIG. 15 provides a differential simulated distillation (SIMDIS) plot comparing the Arab Light raw crude, 5 wt. % and 10 wt. % permeates.

FIG. 15 provides a differential simulated distillation (SIMDIS) plot comparing the Arab Light raw crude, 5 wt % and 10 wt % permeates. The plots show an enrichment of lower boiling saturates molecules in lower boiling point range of the permeate, while the higher boiling tail in the permeate is from the higher boiling saturate molecules (as corroborated from the 2D-GC results). The yield-purity trade-off can be observed with the lower yields (5 wt. %) providing the highest enrichment of lower boiling point (and likely smaller/lighter) species. As higher yields are pushed through the membranes (10 wt. %) the purity of permeate goes down.

Figure 16:
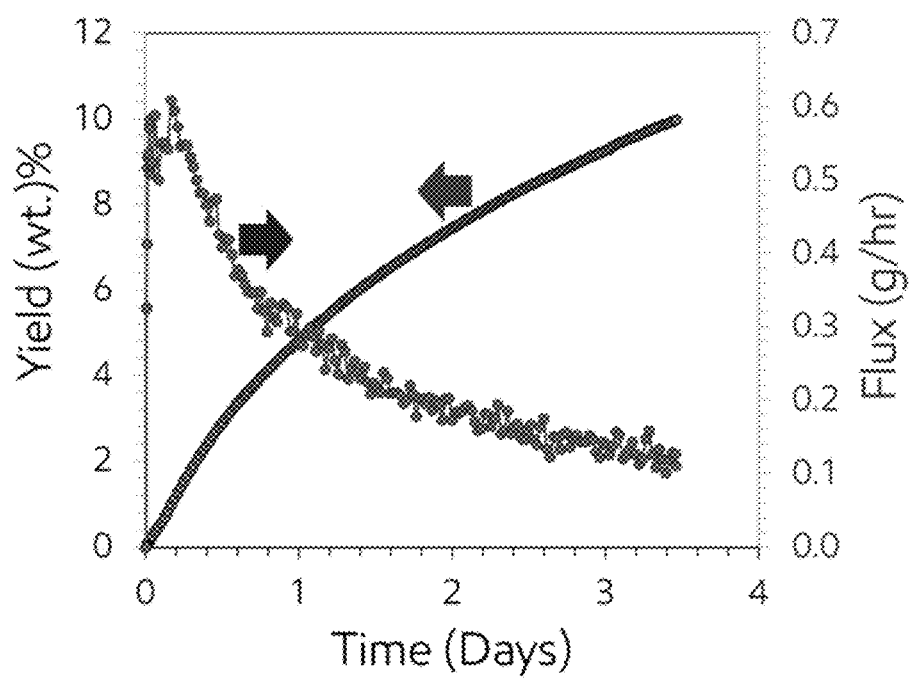
FIG. 16 provides changes in flux and yield of an exemplary perfluoro polymer membrane with the time.

FIG. 16 provides changes in the flux and yield of the membrane with time. As the membrane approaches higher yields, the flux tends to drop indicating the heaving up of the retentate with higher viscosity causing a decrease in membrane flux.

Table 3 shows the preferential permeation of lights and saturates through the membrane with the rejection of 1-5.5 ring aromatics. The saturates in the permeate can further be separated into a wax and oil phase depending on the concentration of higher boiling saturate molecules.

TABLE 3

Permeation of lights and saturates through the membrane with the rejection of 1-5.5 ring aromatics

| Species | 5 wt. % Permeate Wt. % | 10 wt. % Permeate Wt. % | Arab Light IBP-1050° F. Wt. % |
|---|---|---|---|
| Lights(<C8) | 45.1% | 24.9% | 12.4% |
| Saturates | 44.4% | 61.0% | 44.7% |
| Lights + Saturates | 89.5% | 85.9% | 57.1% |
| 1.0-Ring ARO | 6.0% | 8.9% | 10.2% |
| 1.5-Ring ARO | 1.0% | 1.5% | 6.5% |
| 2.0-Ring ARO | 1.1% | 2.0% | 6.8% |
| 2.5-Ring ARO | 0.7% | 0.6% | 5.3% |
| 3.0-Ring ARO | 0.9% | 0.9% | 5.7% |
| 3.5-Ring ARO | 0.5% | 0.1% | 3.6% |
| 4.0-Ring ARO | 0.3% | 0.1% | 2.9% |
| 4.5-Ring ARO | 0.0% | 0.0% | 1.2% |
| 5.0-Ring ARO | 0.0% | 0.0% | 0.7% |
| 5.5-Ring ARO | 0.0% | 0.0% | 0.0% |
| Total | 100% | 100% | 100% |

Additional Embodiments

Embodiment 1

A method for separating a wax product from a hydrocarbon feedstream comprising:
a) conducting a hydrocarbon feedstream to a membrane separation zone, wherein the raw crude contacts a first side of a membrane element, and the membrane element comprises at least one membrane;
b) retrieving a retentate product stream from the first side of the membrane element;
c) retrieving a permeate product stream having a wax phase and an oil phase from a second side of the membrane element, wherein a pour point of the wax phase of the permeate product stream is higher than a pour point of the oil phase of the permeate product stream; and
d) separating a wax product from the wax phase of the permeate product stream.

Embodiment 2

The method of Embodiment 1, wherein the pour point of the wax phase of the permeate product stream is at least 10° C. higher than the pour point of the oil phase of permeate product stream.

Embodiment 3

The method of any of the previous embodiments, wherein the wax product has a pour point of at least 15° C.

Embodiment 4

The method of any of the previous embodiments, wherein the wax product has a pour point in a range of from about 15° C. to about 60° C.

Embodiment 5

The method of any of the previous embodiments, wherein the wax product has a pour point in a range of from about 15° C. to about 40° C.

Embodiment 6

The method of any of the previous embodiments, wherein the wax product has a boiling point in a range of from about 800° F. to about 1200° F.

Embodiment 7

The method of any of the previous embodiments, wherein the hydrocarbon feedstream is a raw crude.

Embodiment 8

The method of any of the previous embodiments, wherein the raw crude has an API density greater than 20.

Embodiment 9

The method of any of the previous embodiments, wherein the permeate product steam is at least 5 wt. % of the total amount of the hydrocarbon feedstream.

Embodiment 10

The method of any of the previous embodiments, wherein the permeate product stream is 70 wt. % to 95 wt. % of the total amount of the hydrocarbon feedstream.

Embodiment 11

The method of any of the previous embodiments, wherein the permeate product stream is 80 wt. % to 95 wt. % of the total amount of the hydrocarbon feedstream.

Embodiment 12

The method of any of the previous embodiments, wherein the permeate product stream is 90 wt. % to 95 wt. % of the total amount of the hydrocarbon feedstream.

Embodiment 13

The method of any of the previous embodiments, wherein a wax-oil separation unit is used for the separation of step d), and the wax-oil separation unit is selected from the group consisting of: a wax settler, a centrifuge, a wax filter, a crystallizer, a cyclone, a fluid extraction device, a solvent dewaxing device and a combination thereof.

Embodiment 14

The method of any of the previous embodiments, wherein the membrane is an organic membrane, an inorganic membrane, a supported liquid or facilitated transport membrane, a hybrid or mixed-matrix membrane, or a combination thereof.

Embodiment 15

The method of any of the previous embodiments, wherein the mixed-matrix membranes comprise inorganic particles as dispersed phase and a polymer matrix as continuous phase.

Embodiment 16

The method of any of the previous embodiments, wherein the membrane is a polymeric membrane, a ceramic membrane, a carbon membrane, or a combinations thereof.

Embodiment 17

The method of any of the previous embodiments, wherein the membrane has an average pore size from about 0.3 nanometer to about 20 nanometer.

Embodiment 18

The method of any of the previous embodiments, wherein the membrane has an average pore size from about 0.3 nanometer to about 10 nanometer.

Embodiment 19

The method of any of the previous embodiments, wherein the membrane has a molecular weight cut-off of about 0.1 kD to about 500 kD.

Embodiment 20

The method of any of the previous embodiments, wherein the membrane has a molecular weight cut-off of about 0.1 kD to about 8 kD.

Embodiment 21

The method of any of the previous embodiments, wherein the membrane has a differential pressure across it from about 20 psi to about 3000 psi.

Embodiment 22

The method of any of the previous embodiments, wherein the membrane element comprises two membranes arranged in sequence.

Embodiment 23

The method of any of the previous embodiments, wherein the membrane separation is conducted in a trans-membrane pressure of from 200 psig to 800 psig.

Embodiment 24

The method of any of the previous embodiments, wherein the membrane separation is conducted in an operating temperature of from about 15° C. to about 300° C.

Embodiment 25

The method of any of the previous embodiments, wherein the permeate product stream has a saturates content that is at least about 70 wt % of the saturates content of the hydrocarbon feedstream.

Embodiment 26

The method of any of the previous embodiments, wherein the permeate product stream has a saturates content that is at least about 80 wt % of the saturates content of the hydrocarbon feedstream.

Embodiment 27

The method of any of the previous embodiments, wherein the permeate product stream has a content of aromatics with a molecular weight greater than 500 that is at least 70% lower than a content of aromatics with a molecular weight greater than 500 of the hydrocarbon feedstream.

Embodiment 28

The method of any of the previous embodiments, wherein the permeate product stream has a micro carbon residue content that is at least 80 wt % lower than a micro carbon residue content of the hydrocarbon feedstream.

Embodiment 29

The method of any of the previous embodiments, wherein the permeate product stream has an inorganic metals content that is at least 60 wt % lower than an inorganic metals content of the hydrocarbon feedstream.

Embodiment 30

The method of any of the previous embodiments, wherein an average boiling point of the permeate product stream is from 500 to 700° F. lower than an average boiling point of the retentate product stream.

Embodiment 31

The method of any of the previous embodiments, wherein the oil phase of the permeate product stream is further processed into an oil product having a pour point of at least 15° C.

Embodiment 32

The method of any of the previous embodiments, wherein the oil phase is further processed in an atmospheric pipestill, a vacuum pipestill or an atmospheric pipestill and then a vacuum pipestill.

Embodiment 33

The method of any of the previous embodiments, wherein the wax product comprises hydrocarbon molecules having at least 20 carbon atoms and contains essentially no hydrocarbon molecules with less than 20 carbon atoms.

Embodiment 34

The method of any of the previous embodiments, wherein the wax product contains no hydrocarbon molecules with less than 20 carbon atoms.

Embodiment 35

An apparatus for separating a wax product from a hydrocarbon feedstream, which comprises a membrane separation unit and a wax-oil separation unit, wherein:

the membrane separation unit comprises a membrane element, and the membrane element has at least one membrane, a retentate zone wherein the hydrocarbon feedstream contacts a first side of the membrane element, and a permeate zone from which a permeate product stream having a wax phase and an oil phase is obtained from a second side of the membrane element, wherein a pour point of the wax phase of permeate product stream is higher than a pour point of the oil phase of permeate product stream; and the wax-oil separation unit separates a wax product from the wax phase of permeate product stream, wherein the wax-oil separation unit is selected from the group consisting of: a wax settler, a centrifuge, a wax filter, a crystallizer, a cyclone, a fluid extraction device, a solvent dewaxing device and a combination thereof.

Embodiment 36

The apparatus of Embodiment 32, wherein the membrane is an organic membrane, an inorganic membrane, a supported liquid or facilitated transport membrane, a hybrid or mixed-matrix membrane, or a combination thereof.

Embodiment 37

The apparatus of anyone of Embodiments 32 and 33, wherein the membrane is a polymeric membrane, a ceramic membrane, a carbon membrane, or a combinations thereof.

Embodiment 38

The apparatus of anyone of Embodiments 32-34, wherein the mixed-matrix membranes comprise inorganic particles as dispersed phase and a polymer matrix as continuous phase.

Embodiment 39

The apparatus of anyone of Embodiments 32-35, wherein the membrane has an average pore size from about 0.3 nanometer to about 20 nanometer.

Embodiment 40

The apparatus of anyone of Embodiments 32-36, wherein the membrane has a molecular weight cut-off of about 0.1 kD to about 500 kD.

Embodiment 41

The apparatus of anyone of Embodiments 32-37, wherein the membrane has a molecular weight cut-off of about 0.1 kD to about 8 kD.

Embodiment 42

The apparatus of anyone of Embodiments 32-38, wherein the membrane element comprises at least two membranes arranged in sequence.

When numerical lower limits and numerical upper limits are listed herein, ranges from any lower limit to any upper limit are contemplated. While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A method for separating a wax product from a hydrocarbon feedstream comprising:
conducting a hydrocarbon feedstream to a membrane separation zone, wherein the hydrocarbon feedstream contacts a first side of at least one membrane;
retrieving a retentate product stream from the first side of the at least one membrane;

retrieving a permeate product stream from a second side of the at least one membrane, wherein the permeate product stream has:
a wax phase and an oil phase,
a pour point of the wax phase of the permeate product stream that is higher than a pour point of the oil phase of the permeate product stream, and
a content of aromatics with a molecular weight greater than 500 that is at least 70 wt % lower than a content of aromatics with a molecular weight greater than 500 of the hydrocarbon feedstream; and
separating a wax product from the wax phase of the permeate product stream.

2. The method of claim 1, wherein the pour point of the wax phase of the permeate product stream is at least 10° C. higher than the pour point of the oil phase of permeate product stream.

3. The method of claim 1, wherein the wax product has a pour point of at least 15° C.

4. The method of claim 1, wherein the wax product has a pour point in a range of from about 15° C. to about 60° C.

5. The method of claim 1, wherein the wax product has a pour point in a range of from about 15° C. to about 40° C.

6. The method of claim 1, wherein the wax product comprises hydrocarbon molecules having at least 20 carbon atoms and contains essentially no hydrocarbon molecules with less than 20 carbon atoms.

7. The method of claim 1, wherein the wax product has a boiling point in a range of from about 800° F. to about 1200° F.

8. The method of claim 1, wherein the hydrocarbon feedstream is a raw crude.

9. The method of claim 8, wherein the raw crude has an API density greater than 20.

10. The method of claim 1, wherein the permeate product steam is at least 5 wt. % of the total amount of the hydrocarbon feedstream.

11. The method of claim 1, wherein the permeate product stream is 70 wt. % to 95 wt. % of the total amount of the hydrocarbon feedstream.

12. The method of claim 1, wherein the permeate product stream is 80 wt. % to 95 wt. % of the total amount of the hydrocarbon feedstream.

13. The method of claim 1, wherein the permeate product stream is 90 wt. % to 95 wt. % of the total amount of the hydrocarbon feedstream.

14. The method of claim 1, wherein a wax-oil separation unit is used for the separation of the wax product from the wax phase, and the wax-oil separation unit is selected from the group consisting of: a wax settler, a centrifuge, a wax filter, a crystallizer, a cyclone, a fluid extraction device, a solvent dewaxing device and a combination thereof.

15. The method of claim 1, wherein the at least one membrane is an organic membrane, an inorganic membrane, a supported liquid or facilitated transport membrane, a hybrid or mixed-matrix membrane, or a combination thereof.

16. The method of claim 15, wherein the at least one membrane comprises a mixed-matrix membrane comprising inorganic particles as dispersed phase and a polymer matrix as continuous phase.

17. The method of claim 1, wherein the membrane is a polymeric membrane, a ceramic membrane, a carbon membrane, or a combinations thereof.

18. The method of claim 1, wherein the membrane has an average pore size from about 0.3 nanometer to about 20 nanometer.

19. The method of claim 1, wherein the membrane has an average pore size from about 0.3 nanometer to about 10 nanometer.

20. The method of claim 1, wherein the membrane has a molecular weight cut-off of about 0.1 kD to about 500 kD.

21. The method of claim 1, wherein the membrane has a molecular weight cut-off of about 0.1 kD to about 8 kD.

22. The method of claim 1, wherein the membrane has a transmembrane pressure across it from about 20 psi to about 3000 psi.

23. The method of claim 1, wherein the at least one membrane clement comprises two membranes arranged in sequence.

24. The method of claim 1, wherein the membrane separation is conducted in a trans-membrane pressure of from 200 psig to 800 psig.

25. The method of claim 1, wherein the membrane separation is conducted in an operating temperature of from about 15° C. to about 300° C.

26. The method of claim 1, wherein the permeate product stream has a saturates content that is at least about 70 wt. % of the saturates content of the hydrocarbon feedstream.

27. The method of claim 1, wherein the permeate product stream has a saturates content that is at least about 80 wt. % of the saturates content of the hydrocarbon feedstream.

28. The method of claim 1, wherein the permeate product stream has a micro carbon residue content that is at least 80 wt % lower than a micro carbon residue content of the hydrocarbon feedstream.

29. The method of claim 1, wherein the permeate product stream has an inorganic metals content that is at least 60 wt % lower than an inorganic metals content of the hydrocarbon feedstream.

30. The method of claim 1, wherein an average boiling point of the permeate product stream is from 500 to 700° F. lower than an average boiling point of the retentate product stream.

31. The method of claim 1, wherein the oil phase of the permeate product stream is further processed into an oil product having a pour point of at least 15° C.

32. The method of claim 1, wherein the oil phase is further processed in an atmospheric pipestill, a vacuum pipestill or an atmospheric pipestill and then a vacuum pipestill.

33. An apparatus for separating a wax product from a hydrocarbon feedstream, the apparatus comprising a membrane separation unit and a wax-oil separation unit, wherein:
the membrane separation unit comprises:
at least one mixed-matrix membrane comprising inorganic particles as a dispersed phase and a polymer matrix as a continuous phase,
a retentate zone wherein the hydrocarbon feedstream contacts a first side of the at least one mixed-matrix membrane, and
a permeate zone from which a permeate product stream is obtained from a second side of the at least one mixed-matrix membrane,
wherein the wax-oil separation unit is selected from the group consisting of: a wax settler, a centrifuge, a wax filter, a crystallizer, a cyclone, a fluid extraction device, a solvent dewaxing device and a combination thereof.

34. The apparatus of claim 33, wherein the separation unit comprises a polymeric membrane, a ceramic membrane, a carbon membrane, or a combinations thereof.

35. The apparatus of claim 33, wherein the mixed-matrix membrane has an average pore size from about 0.3 nanometer to about 20 nanometer.

36. The apparatus of claim 33, wherein the mixed-matrix membrane has a molecular weight cut-off of about 0.1 kD to about 500 kD.

37. The apparatus of claim 33, wherein the mixed-matrix membrane has a molecular weight cut-off of about 0.1 kD to about 8 kD.

38. The apparatus of claim 33, wherein the membrane separation unit comprises at least two membranes arranged in sequence.

39. The apparatus of claim 33, wherein:
the permeate product stream comprises a wax phase and an oil phase, wherein a pour point of the wax phase of permeate product stream is higher than a pour point of the oil phase of the permeate product stream; and
the wax-oil separation unit is capable of separating a wax product from the wax phase of permeate product stream.

40. A method for separating a wax product from a hydrocarbon feedstream comprising:
conducting a hydrocarbon feedstream to a membrane separation zone, wherein the hydrocarbon feedstream contacts a first side of at least one mixed-matrix membrane comprising inorganic particles as dispersed phase and a polymer matrix as continuous phase;
retrieving a retentate product stream from the first side of the membrane element;
retrieving a permeate product stream from a second side of the membrane element, wherein the permeate product stream has:
a wax phase and an oil phase, and
a pour point of the wax phase of the permeate product stream that is higher than a pour point of the oil phase of the permeate product stream; and
separating a wax product from the wax phase of the permeate product stream.

41. A method for separating a wax product from a hydrocarbon feedstream comprising:
conducting a hydrocarbon feedstream to a membrane separation zone, wherein the hydrocarbon feedstream contacts a first side of at least one membrane;
retrieving a retentate product stream from the first side of the at least one membrane;
retrieving a permeate product stream from a second side of the at least one membrane, wherein the permeate product stream has:
a wax phase and an oil phase,
a pour point of the wax phase of the permeate product stream that is higher than a pour point of the oil phase of the permeate product stream, and
a micro carbon residue content that is at least 80 wt % lower than a micro carbon residue content of the hydrocarbon feedstream; and
separating a wax product from the wax phase of the permeate product stream.

* * * * *